US008013586B2

(12) United States Patent
Tlaskal et al.

(10) Patent No.: US 8,013,586 B2
(45) Date of Patent: Sep. 6, 2011

(54) SYNCHRONOUS RECTIFIER HAVING PRECISE ON/OFF SWITCHING TIMES

(75) Inventors: Ondrej Tlaskal, Prague (CZ); Bohumil Janik, Luhacovice (CZ); David Burda, Prague (CZ); Julien Picq, Prague (CZ); Miroslav Hukel, Detva (CZ)

(73) Assignee: STMicroelectronics Design and Application S.r.o., Prague (CZ)

( * ) Notice: Subject to any disclaimer, the term of this patent is extended or adjusted under 35 U.S.C. 154(b) by 400 days.

(21) Appl. No.: 11/961,401

(22) Filed: Dec. 20, 2007

(65) Prior Publication Data

US 2008/0211473 A1    Sep. 4, 2008

(30) Foreign Application Priority Data

Dec. 22, 2006    (EP) ..................................... 06127185

(51) Int. Cl.
*G05F 1/00*    (2006.01)
(52) U.S. Cl. ........................................ 323/288; 323/282
(58) Field of Classification Search .................. 323/223, 323/282, 284, 285, 288; 363/127
See application file for complete search history.

(56) References Cited

U.S. PATENT DOCUMENTS

| 6,396,250 B1 | 5/2002 | Bridge | |
|---|---|---|---|
| 2004/0130307 A1 | 7/2004 | Dequina et al. | |
| 2005/0134491 A1* | 6/2005 | Huang et al. | 341/143 |
| 2006/0145902 A1* | 7/2006 | Tucholski | 341/144 |

FOREIGN PATENT DOCUMENTS

WO    WO 2006/010293 A1    10/2006

OTHER PUBLICATIONS

European Search Report from corresponding European Application No. EP 06 12 7185.
Levy, A. et al. "A CMOS Low-Power, High-Speed, Asynchronous Comparator for Synchronous Rectification Applications" Candence Design Systems, International Symposium on Circuits and Systems, Geneva, Switzerland, vol. 2, pp. II-541-II544, May 28-31, 2000, ISSN: 0-7803-5482-6.

\* cited by examiner

*Primary Examiner* — Harry Behm
*Assistant Examiner* — Matthew Grubb
(74) *Attorney, Agent, or Firm* — Lisa K. Jorgenson; James H. Morris; Wolf, Greenfield & Sacks, P.C.

(57) ABSTRACT

A synchronous rectifier, including an energy storage element having a terminal; a power supply input, connected to the terminal of the storage element in a first time interval; a reference line connected to the terminal of the storage element in a second time interval; and a zero comparator, coupled to the terminal of the storage element to detect a current flowing in the energy storage element and disconnect the terminal of the storage element from the reference line upon detecting a zero current, the zero comparator having an offset and a propagation time; the zero comparator further having an offset control input and an output. An offset regulating loop is coupled between the output of the zero comparator and the offset control input and regulates the offset of the zero comparator to compensate the propagation time.

22 Claims, 5 Drawing Sheets

| | s2 | ZC | sD_2 | Ds2 | UP | DOWN |
|---|---|---|---|---|---|---|
| > t4 | 1 | 0 | 1 | 1 | 0 | 0 |
| t4 | 0 | 1 | 1 | 1 | 1 | 1 |
| t5 | 0 | 0 | 1 | 1 | 1 | 0 |
| t2 | 0 | 1 | 1 | 1 | 0 | 1 |
| t6 | 0 | 1 | 0 | 0 | 0 | 0 |

Fig.13

SYNCHRONOUS RECTIFIER HAVING PRECISE ON/OFF SWITCHING TIMES

BACKGROUND OF THE INVENTION

1. Field of the Invention

The present invention relates to a synchronous rectifier, in particular, but not exclusively, for use in mobile applications.

2. Discussion of the Related Art

As known, mobile applications require high-efficiency synchronous rectifiers, having precise on/off switching times, where a diode that dissipates most of the power. Such applications include particularly Switched Mode Power Supplies (SMPS) of all topologies. In the following, reference will be made to a step down (buck) converter, although the invention is not limited thereto, but can be used in any application where rectification efficiency is needed.

Figure 1:
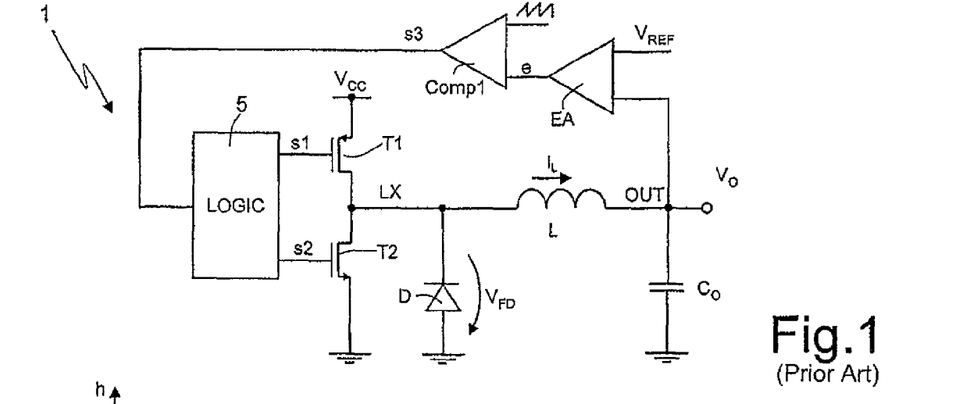
FIG. 1 is a schematic diagram of a known buck converter.

A typical buck converter 1 is shown in FIG. 1. The buck converter 1 comprises an inductor L storing energy from a power supply $V_{CC}$ (for example a battery) and transferring the stored energy to an output node OUT; a switch T1, here a PMOS transistor, for connecting the power supply $V_{CC}$ to a first terminal of the inductor L (node LX between the inductor L and the switch T1) during a charging step and disconnecting the inductor L from the power supply $V_{CC}$ during an energy transfer step; a freewheeling diode D, connecting the first terminal of the inductor L to ground and allowing recirculation of the inductor current $I_L$ during the energy transfer step; an output capacitor $C_O$ connected to the output node OUT (second terminal of the inductor L) for filtering an output voltage $V_O$; a second switch T2, here an NMOS transistor, connected in parallel to the diode D; a feedback circuit including an integrator (error amplifier) EA and a first comparator Comp1, connected to the output node OUT; and a logic circuit 5 receiving an output signal of the feedback circuit, Comp1 and generating a first and a second control signals s1, s2 for, respectively, the first and second switches T1, T2. In a known manner, integrator EA receives the output voltage $V_O$ and a reference voltage $V_{REF}$ and generates an error signal e fed to the first comparator Comp1; first comparator Comp1 also receives a saw-tooth signal and generates a duty-cycle signal s3 used by logic circuit 5 to drive switches T1 and T2.

In the simplest implementation, NMOS transistor T2 is not necessary and the conduction of the recirculation current is carried out by diode D. The disadvantage in using only diode D resides in the large power loss when diode D is forward biased (i.e., during the freewheeling period). In particular, the power losses P are approximately given by:

$$P = \frac{1}{T}\int_{t_1}^{t_2} V_{FD} I_L \, dt$$

wherein:

1/T is the working frequency of the converter 1;

$t_2-t_1$ is the conduction time of the diode D;

$I_L$ is the current through the inductor L (equal to the diode current in the recirculation step);

and $V_{FD}$ is the diode forward voltage.

Since Schottky diodes have a lower forward voltage as compared to PN diodes, they are preferred and allow an improvement of the recirculation losses by a factor of two.

Figure 2:
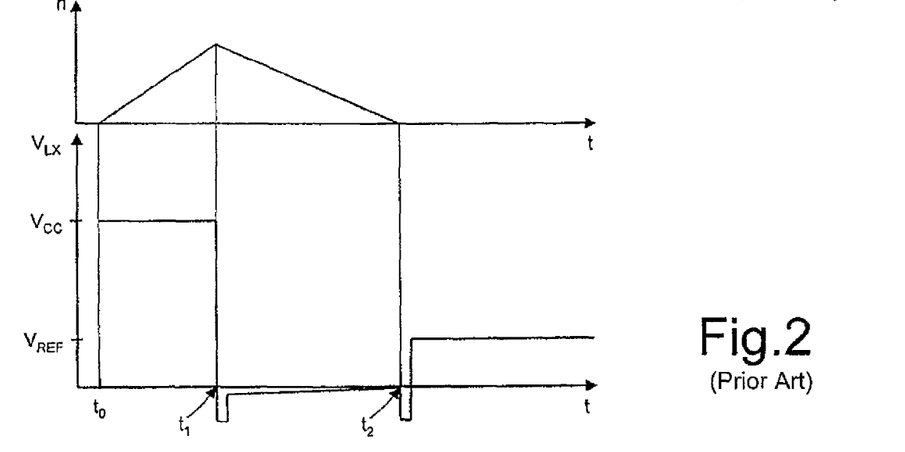
FIG. 2 shows the plot of electric quantities in the circuit diagram of FIG. 1.

A further improvement is obtained through NMOS transistor T2, which can be driven so as to have a very low voltage drop. NMOS transistor T2 is controlled by control signal s2 so as to be on only during the recirculation step, as explained in greater detail hereinafter, with reference to the plots of FIG. 2. FIG. 2 show the behavior of the current $I_L$ flowing through the inductor L and of the voltage $V_{LX}$ on node LX in case of a small load connected to the output OUT of the converter 1.

Initially, at time $t_0$, PMOS transistor T1 is switched on and connects node LX to the power supply $V_{cc}$; NMOS transistor T2 is off. Thus the inductor current $I_L$ rises linearly with a slope SL:

$$SL = (V_{cc} - V_O)/L$$

wherein L is the inductance of the inductor L.

At time $t_1$, determined by the feedback circuit EA, Comp1, PMOS transistor T1 is switched off and NMOS transistor T2 is switched on. Thereafter, neglecting the negative spike due to the switching-on time of the NMOS transistor T2, voltage $V_{LX}$ is equal to the voltage drop across NMOS transistor T2 and depends on the resistance $R_{DSon}$ of the NMOS transistor T2 and the recirculation current $I_L$, as follows:

$$V_{LX} = -(R_{Dson} * I_L). \quad (1)$$

When inductor current $I_L$ reaches zero (time $t_2$), neglecting a negative spike due to the switching-off time of the NMOS transistor T2, voltage $V_{LX}$ becomes equal to the output voltage $V_O$, in turn equal to the reference voltage $V_{REF}$.

In this circuit, the correct timing of both turning-on and turning-off of the NMOS transistor T2 is critical. In fact:

if NMOS transistor T2 is turned on too early, some charging current flows from the power supply to ground, causing undesired power consumption and reduction in efficiency;

if NMOS transistor T2 is turned on too late or is turned off too early, part of the recirculation current flows through the diode D, causing large losses on the same;

if NMOS transistor T2 is turned off too late, the inductor current $I_L$ reverses and reduces the overall efficiency.

There are very different design requirements for the logic circuit 5 managing the turn on and turn off control signals s1, s2. For example, the design requirements are dictated by the operation mode, i.e., whether the step-down converter 1 is operated in Pulse Width Modulation PWM mode or in Pulse Frequency Modulation PFM mode. In fact, the PFM mode is totally asynchronous, thus preventing the use of any solution based on periodic clocking.

However, ideally, the design should cover both operation modes, that is any type of Discontinuous Conduction Mode DCM.

Hereinafter, in particular the problem of exactly determining the switching-off instant of the NMOS transistor T2 will be addressed.

As indicated, the NMOS transistor T2 should be ideally switched off when the current $I_L$ through the inductor L exactly reaches the zero value. According to a possible solution, shown in FIG. 3, the current $I_L$ through the inductor L is sensed by a sense resistor $R_s$ arranged in series to the NMOS transistor T2 and diode D. The voltage across the sense resistor $R_s$ is detected by a second comparator Comp2 which generates a suitable signal Z when current $I_L$ reaches zero. Signal Z is fed to the logic circuit 5 to cause switching off of the NMOS transistor T2.

Figure 3:
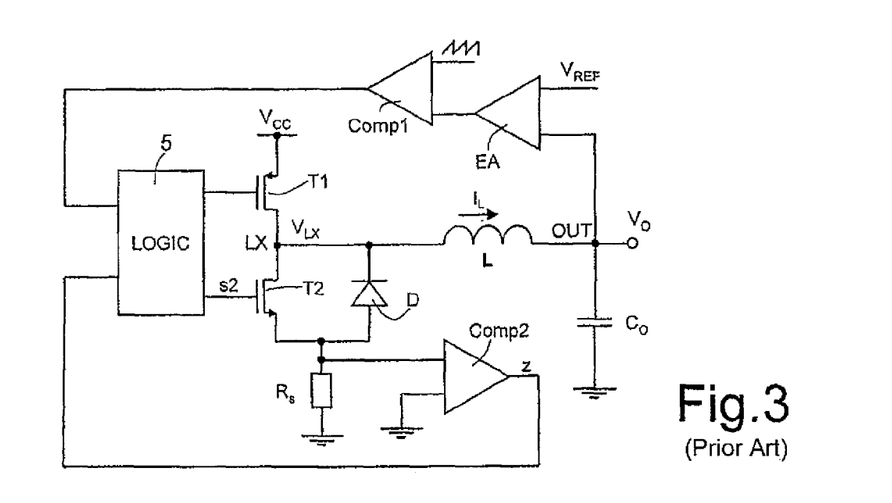
FIG. 3 is a schematic diagram of a buck converter including a first zero detection circuit.

In this solution, the resistance of the sense resistor $R_s$ should satisfy conflicting requirements. In fact, the larger the resistance, the higher the current-to-voltage gain and thus the accuracy of the second comparator Comp2. However, the larger the resistance, the larger the losses on the sense resistor $R_s$. Thus such a solution is not suitable for high efficiency applications.

Figure 4:
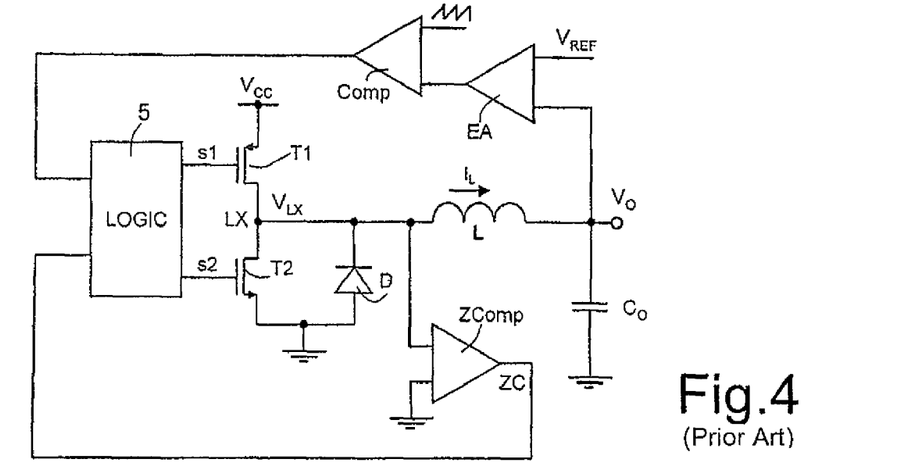
FIG. 4 is a schematic diagram of a buck converter including a different zero detection circuit.

According to a different solution, the resistive behavior of the NMOS transistor T2 is exploited, as shown in FIG. 4. In fact, according to (1), during the energy transfer step, NMOS transistor T2 has a voltage drop proportional to its $R_{DSon}$, which can be used for detecting the inductor current. In this case, a zero comparator ZComp has a first input connected to node LX, a second input connected to ground, and an output supplying a zero signal $Z_C$ and connected to the logic circuit 5.

$R_{DSon}$ has a very low value (of about 100 mΩ), which puts extreme requirements on the zero comparator ZComp in terms of input offset and propagation delay.

Figure 5A:
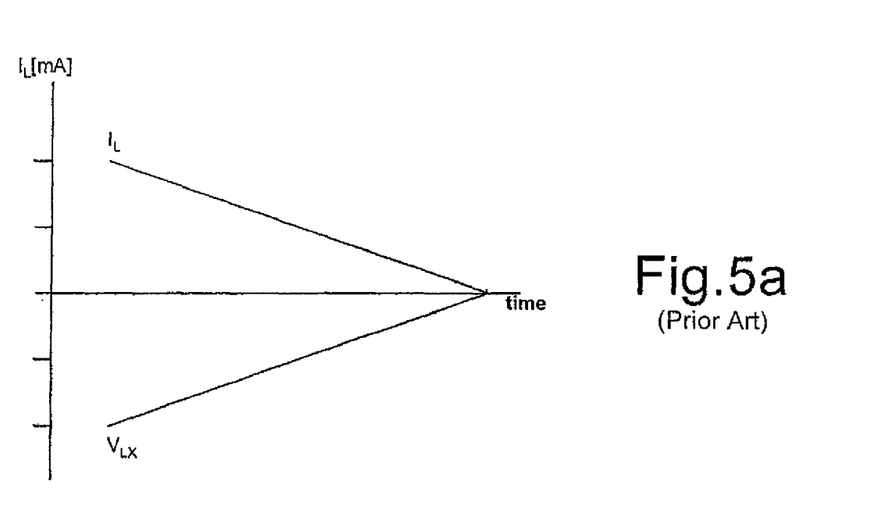
FIGS. 5a and 5b show plots of some quantities for the circuit of FIG. 4.
Figure 5B:
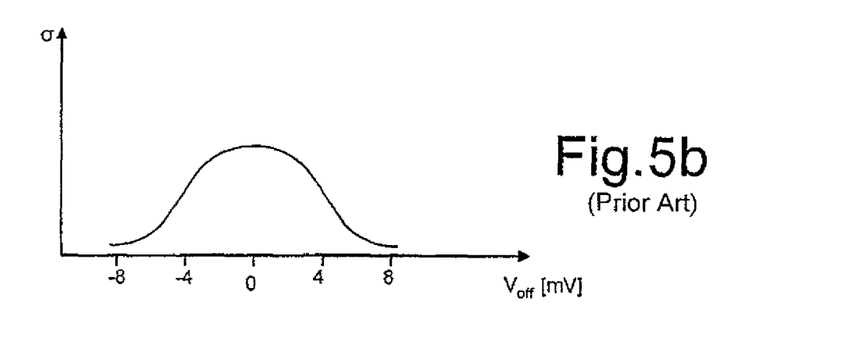

In fact, the attainable input offset is greater than the quantity to be measured. This is clear from consideration of the plots FIGS. 5a and 5b. FIG. 5a shows an enlarged portion of the current $I_L$ and the voltage $V_{LX}$ near time $t_2$ (neglecting the voltage spike). FIG. 5b shows a typical distribution of the comparator offset of a CMOS process usable for the intended application. In particular, for an inductor current $I_L$=10 mA, assuming $R_{DSon}$=100 mΩ, $V_{LX}$=1 mV. Typical matching characteristics of a CMOS process give an offset comprised in a ±8 mV range. Therefore the zero comparator ZComp should measure a 1 mV voltage with a ±8 mV accuracy. This is not possible, since a 8 mV offset may cause the zero comparator ZComp to generate the zero signal $Z_C$ and thus switching off of the NMOS transistor T2 while 80 mA are still flowing through the inductor L. Considering that the peak value of the inductor current $I_L$ may be comprised between 100 and 150 mA, the synchronous rectifier would be inefficient for most of the time.

A source of error also lies in the propagation time, that is the time needed by the zero comparator ZComp to generate the zero signal $Z_C$ after detecting the zero condition (also called decision time). As known, the propagation time also depends on the voltage level at the input of the zero comparator ZComp. A low voltage level causes the decision time of the zero comparator ZComp to dramatically extend. For example, a zero comparator driven with a 1V/µs triangular waveform may have a decision time of 8 ns, while the same comparator drive with a 1 µV/µs has a 45 ns decision time. Since the inductor current slope $SI_L$ for an output voltage $V_O$=2V and an inductance L=4.7 µH is:

$$SI_L = (V_{LX} - V_O)/L \approx -2\ V/4.7\ \mu H \approx -0.4\ A/\mu s$$

the propagation delay may cause the NMOS transistor T2 to switch off when the inductor current reaches −0.4 A/µs*45 ns=−18 mA. Such a reverse current in the inductor L is not acceptable.

SUMMARY OF THE INVENTION

An aspect of the invention provides a synchronous rectifier operating in an accurate and efficient way in spite of the above discussed problems of offset and propagation time.

According to one embodiment of the present invention, there is provided a synchronous rectifier, comprising an energy storage element having a terminal; a power supply input, connected to the terminal of the storage element in a first time interval; a reference line connected to the terminal of the storage element in a second time interval; a zero comparator, coupled to the terminal of the storage element to detect a current flowing in the energy storage element and disconnect the terminal of the storage element from the reference line upon detecting a zero current, the zero comparator having an offset and a propagation time; the zero comparator further having an offset control input and an output; and an offset regulating loop coupled between the output of the zero comparator and the offset control input and regulating the offset of the zero comparator to compensate the propagation time.

According to another embodiment of the present invention, there is provided a method for controlling switching of a synchronous rectifier comprising an energy storage element, comprising connecting a terminal of the energy storage element to a power supply input in a first time interval; connecting the terminal of the energy storage element to a reference line in a second time interval; detecting a current flowing in the energy storage element using a zero comparator having an offset and a propagation time; disconnecting the terminal of the energy storage element from the reference line upon detecting a zero current in the energy storage element; the method further comprising regulating the offset of the zero comparator to compensate the propagation time.

BRIEF DESCRIPTION OF THE DRAWINGS

For the understanding of the present invention, a preferred embodiment thereof is now described, purely as a non-limitative example, with reference to the enclosed drawings, wherein.

DETAILED DESCRIPTION

Figure 6:
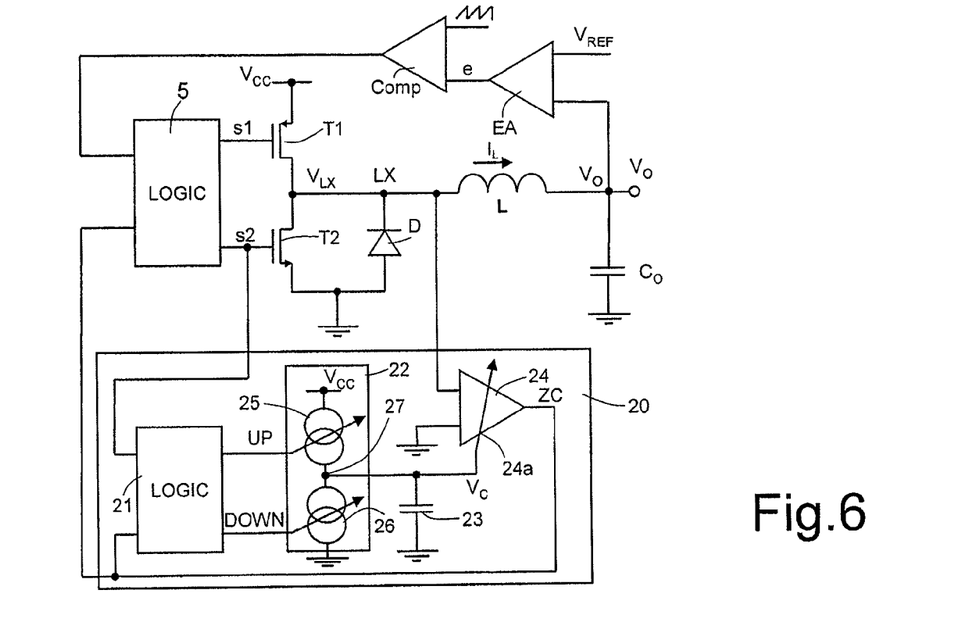
FIG. 6 shows a schematic diagram of a buck converter including a compensated zero detection circuit according to an embodiment of the invention.

FIG. 6 shows an embodiment of a buck converter 10 having the basic structure shown in FIG. 1 (and thus not described any more) and including a compensated zero detection circuit 20. Zero detection circuit 20 comprises a timing detector 21; a charge pump 22; a filter 23 and an offset-controlled comparator 24, representing a zero comparator.

Figure 11:
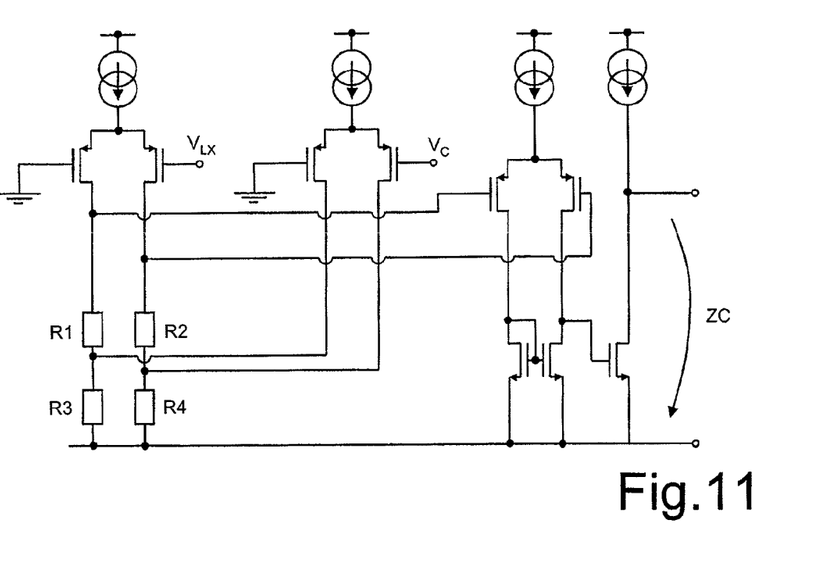
FIGS. 11 and 12 are circuit schemes of two components of the diagram of FIG. 6.

Offset-controlled comparator 24 (an embodiment whereof is shown in FIG. 11) has a first input connected to node LX, a second input connected to ground, an output connected to logic circuit 5 and an offset regulation input 24a.

Figure 12:
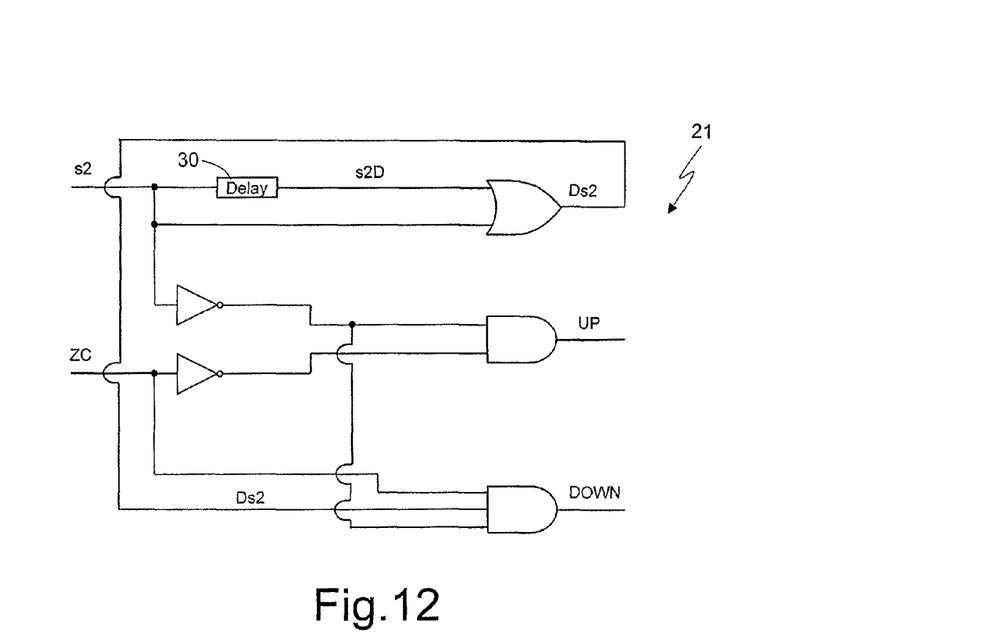

Timing detector 21 (an embodiment whereof is shown in FIG. 12, including also the scheme of the logic circuit 5), has a first input connected to the gate of the NMOS transistor T2, a second input connected to the output of the offset-controlled comparator 24, a first output supplying a first digital signal UP and a second output supplying a second digital signal DOWN. Charge pump 22 comprises an upper current source 25 and a lower current source 26 connected in series between power supply $V_{CC}$ and ground. Upper and lower current sources 25, 26 are of a switchable type and receive respectively the first and the second digital signals UP and DOWN so as to be switched on/off alternatively and in counter-phase.

An intermediate node 27 between the upper and the lower current sources 25, 26 is connected to the offset regulation input 24a of the offset-controlled comparator 24.

Filter 23 comprises an integration capacitor arranged between intermediate node 27 and ground.

The compensated zero detection circuit 20 automatically adjusts the offset voltage Voff of the offset-controlled comparator 24 through the charge pump 22 so as to compensate the (constant but unknown) propagation time $\Delta t$ thereof and cause the NMOS transistor T2 to switch off when the inductor current $I_L$ is nearly zero. Thereby, the conduction time of the diode and thus the power loss is reduced to a minimum.

Figure 7:
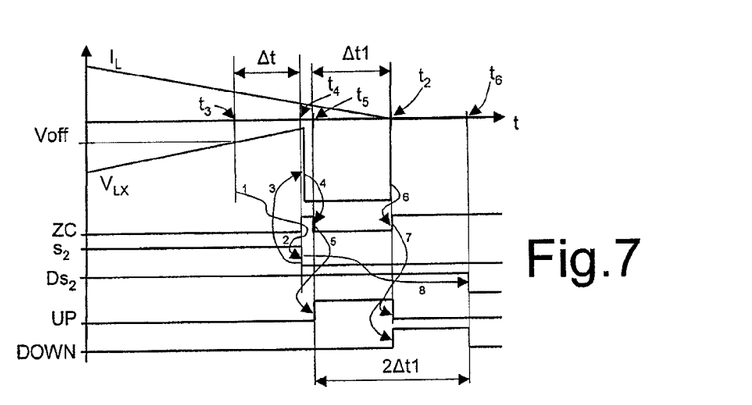
FIGS. 7-9 show different timing diagrams for the circuit of FIG. 6 in three different conditions.

The operation of the compensated zero detection circuit 20 of FIG. 6 will now be described with reference to FIG. 7, showing the plot of some quantities and signals in a balanced condition of the compensated zero detection circuit 20, starting from an intermediate portion of the recirculation step, between instants $t_1$ and $t_2$ of the FIG. 2 plot.

In this interval, as above discussed, the inductor current $I_L$ is decreasing linearly and the voltage $V_{LX}$ is increasing linearly (due to the resistive behavior of the NMOS transistor T2) and is in the range of a few mV.

At time $t_3$ the voltage $V_{LX}$ becomes equal to the offset voltage Voff of the offset-controlled comparator 24, causing the switching of the zero signal $Z_C$ to high; thus, the logic circuit 5 causes the second control signal s2 to switch to low and the NMOS transistor T2 to turn off (instant $t_4$). Consequently, the inductor current $I_L$ starts flowing through the diode D and voltage $V_{LX}$ drops to $-V_{FD}$, due to the diode forward voltage.

The decrease of the voltage $V_{LX}$ below the offset voltage Voff is detected by the offset-controlled comparator 24, whose output signal (zero signal $Z_C$) is forced back to zero (time $t_5$). The falling edge of the zero signal $Z_C$ is detected by the timing circuit 21 which turns on the first digital signal UP, causing turning on of the respective first current source 25.

In the meantime, the inductor current $I_L$ reaches the zero value (time t2), turning off the diode D; thus, voltage $V_{LX}$ instantly raises to the output voltage $V_O$. Therefore, zero signal $Z_C$ switches again to high; this time, the propagation delay of the offset-controlled comparator 24 is negligible because the input voltage swing is of the order of volts.

The second leading edge of the zero signal $Z_C$ is detected by the timing circuit 21, which forces the first digital signal UP to low and the second digital signal DOWN to high, thus turning off first current source 25 and turning on second current source 26. After a delay, the second digital signal DOWN is forced to low by the falling edge of delayed control signal DS2, which is a delayed replica of the second control signal s2.

During interval $t_5$–$t_6$, the current (positive or negative) generated by the charge pump 22 is fed to the filter 23 that integrates it and generates an offset control voltage VC supplied to the offset regulation input 24a of the offset-controlled comparator 24, thus regulating the offset thereof so as to compensate the propagation time $\Delta t$.

In particular, the compensated zero detection circuit 20 represents a closed loop that regulates the on/off times of the first and second current sources 25, 26 to be equal. Thus, when the compensated zero detection circuit 20 is in equilibrium, the length of the pulses of the digital signals UP and DOWN is equal. The NMOS transistor T2 does not actually turn off when the inductor current is zero, but, in the balanced condition of the compensated zero detection circuit 20, it turns off a small time before the zero crossing (advance time $\Delta t1$), which is built-in into the timing detector 21, as explained in more detail later on. Thus, the delay between the control signal s2 and the delayed control signal Ds2 is chosen to be twice the advance time at equilibrium ($2\Delta t1$). For example, for a delay $2\Delta t1$ between the second control signal s2 and the delayed control signal Ds2 of 40 ns (and thus an equilibrium advance time $\Delta t1$=20 ns), the inductor current is:

$I_L$=−0.4 mA/ns*(−20 ns)=8 mA, which is much smaller than according to the prior art.

In fact, the above value is a worst-case scenario because the second rising edge of the zero signal $Z_C$ has a propagation delay with respect to time t2 which is smaller than $\Delta t$, but such as to push the actual switch off time of the NMOS transistor T2 closer to the ideal one.

Figure 8:
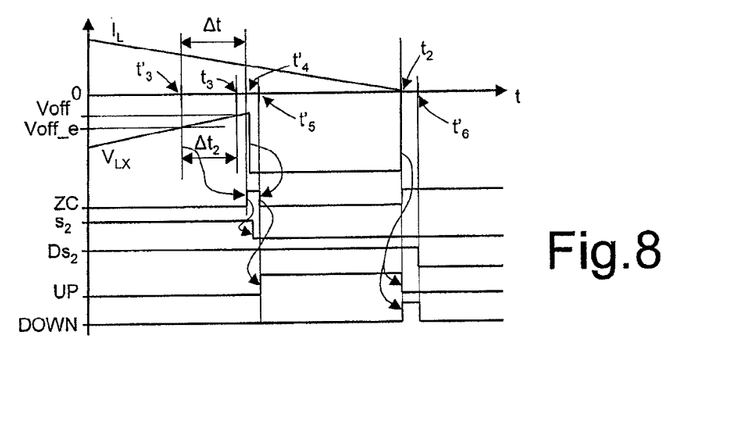
Figure 9:
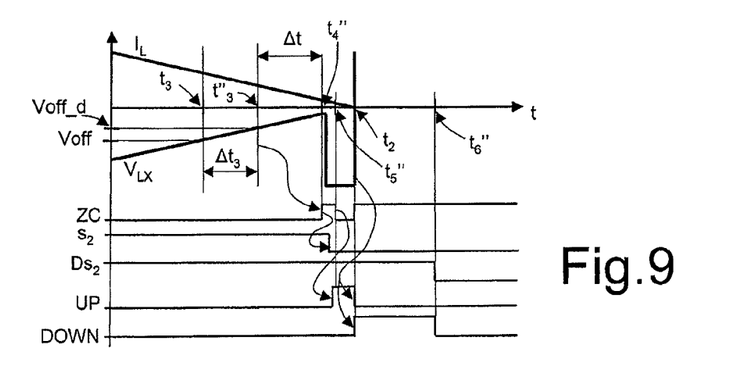

As indicated above, in an unbalanced condition, the duration of the UP and DOWN pulses is automatically controlled, as shown in FIGS. 8 and 9.

In detail, FIG. 8 refers to a situation where the offset voltage Voff_e is lower than the balanced value Voff. In such a condition, the zero detector 24 detects the zero crossing at time $t_3$', earlier than time $t_3$ by $\Delta t2$, and the first switching of the zero signal $Z_C$ occurs also earlier, at time $t_4$'. Since time $t_2$ (when the inductor current $I_L$ reaches the zero value and the second digital signal DOWN is forced to the high level) does not change, but time $t_6$' (end of the DOWN pulse) occurs earlier (also by $\Delta t2$), this cause the first digital signal UP to be much longer and the second digital signal DOWN to be much shorter than in the balanced situation. Therefore upper current source 25 is activated for a longer time than lower current source 26, causing an increase in the offset control voltage VC and thus an increase in the offset voltage Voff_e to bring it nearer to the balanced condition.

Analogously, if the actual offset voltage (Voff_d) is too high, as shown in the plots of FIG. 9, zero crossing detecting occurs at $t_3$", later than $t_3$ by $\Delta t3$, the rising edge of the first digital signal UP occurs at $t_4$", the falling edge of the first pulse of the zero signal $Z_C$ occurs at $t_5$"; thus the second digital signal DOWN is much longer than the first digital signal UP, causing a reduction in the offset voltage Voff_d toward the balanced condition.

If the initial timing error is so large that the NMOS transistor T2 turns off after the zero crossing of the inductor current $I_L$ (not shown), that is when the inductor current has reversed, the voltage $V_{LX}$ does not become negative and consequently there is only one rising edge of the zero signal $Z_C$. The first digital signal UP has no pulses and the second digital signal DOWN has a constant length. This behavior inserts a non-linearity into the timing detector 21. Similarly, a large negative timing error results in the first digital signal UP whose falling edge may occur after the falling edge of the delayed control signal DS2 will be longer than the delayed control signal DS2, due to the early switching of the second control signal s2; thus no second digital signal DOWN may be generated. In this case, the gain timing detector is reduced to a half, because the length of the pulse of the first digital signal UP is always proportional to the timing error.

Figure 10:
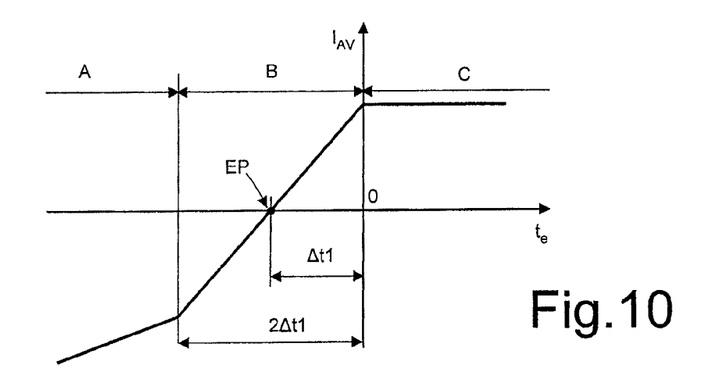
FIG. 10 shows the transfer function of the compensated zero detection circuit of FIG. 6.

The above behavior is visible in FIG. 10, wherein te is the timing error, $I_{AV}$ is the average current supplied by the current sources 25, 26, EP is the equilibrium point, region B is the equilibrium region, region C is the non-linear region where no UP pulse is generated, region A is the non-linear region where no DOWN pulse is generated, $\Delta t1$ is the equilibrium advance time and $2\Delta t1$ is the delay between control signal s2 and delayed control signal DS2.

Figure 13:
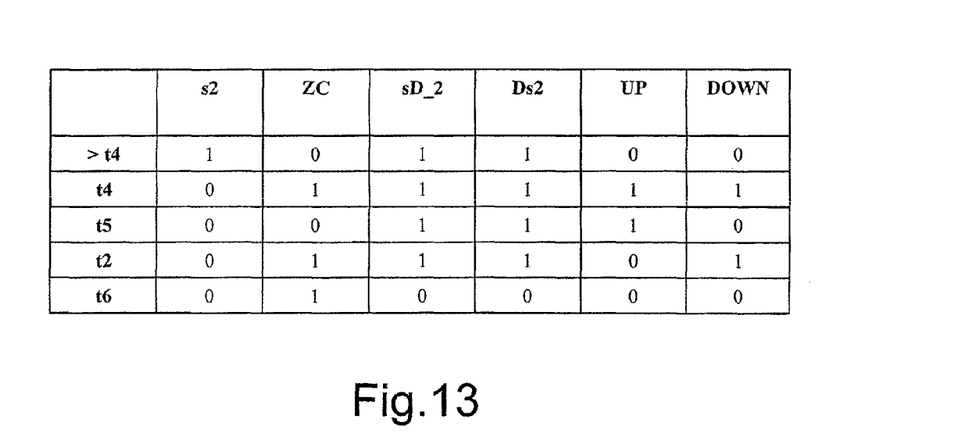
FIG. 13 shows the truth table for the logic circuit of FIG. 12.

FIGS. 12 and 13 show an embodiment of the timing detector 21 and its operation, wherein delay element 30 introduces a delay of 2Δt1. In this circuit, a short pulse is present on the second digital signal DOWN before the pulse of the first digital signal UP; however it does not impair the operation of the circuit. In fact, such a short pulse is integrated by the loop filter and just causes a small timing shift of the equilibrium point.

The advantages of the present invention are clear from the above. In particular, the described synchronous rectifier ensures a timely switching of the NMOS transistor, reducing to a minimum conduction time of the diode D and thus the losses caused by the latter.

Furthermore, the voltage of the filter 23 does not change with the load nor with the operation mode (PWM or PFM) of the circuit; thus the circuit of FIG. 6 operates reliably and reproducibly in different conditions.

Finally, it is clear that numerous variations and modifications may be made to the synchronous rectifier described and illustrated herein, all falling within the scope of the invention as defined in the attached claims. In particular, it is stressed that the present invention is applicable to synchronous rectifiers of any type, not limited to the described topology or application; and the circuits of FIGS. 11 and 12 are only representative of possible solution, without the invention being limited thereto.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An offset regulating loop for a synchronous rectifier, the offset regulating loop comprising:
   means to detect current flowing in an energy storage element of the synchronous rectifier; and
   means to open a controlled switch in a current recirculation loop for the energy storage element at a selected time before current in the current recirculation loop falls to a zero value, the means to open being responsive to the means to detect current flowing in the energy storage element,
   wherein the means to detect comprises a comparator having an offset control input;
   wherein the means to open comprises a first and a second current source, wherein the first current source is configured to provide a first current to an integrator for a first time interval before the current flowing in the energy storage element falls to a zero value, and the second current source is configured to provide a second current of opposite polarity to the first current to the integrator for a second time interval after the current flowing in the energy storage element falls to a zero value;
   wherein the integrator is configured to provide an integrated signal to the offset control input of the comparator; and
   wherein the integrated signal adjusts an offset of the comparator in a manner to maintain the first and second time intervals at approximately equal values.

2. The offset regulating loop of claim 1, wherein the controlled switch is a transistor.

3. The offset regulating loop of claim 1, wherein the first time interval and second time interval are each about 20 nanoseconds.

4. The offset regulating loop of claim 1 incorporated in a mobile electronic device.

5. An offset regulating loop for a synchronous rectifier, the offset regulating loop comprising:
   a comparator having an offset control input, the comparator adapted to sense a current flowing through an energy storage element of the synchronous rectifier, wherein the comparator is configured to provide a signal for opening a controlled switch in a current recirculation loop for the energy storage element at a selected time before current in the current recirculation loop falls to a zero value;
   a timing detector adapted to receive an output signal from the comparator;
   at least one current source configured to receive a control signal from the timing detector; and
   an integrator configured to receive current from the at least one current source and provide an integrated signal to the offset control input of the comparator,
   wherein the timing detector is adapted to provide a first control signal to a first current source of the at least one current source for a first time interval before current flowing through the energy storage element falls to a zero value, and the timing detector is adapted to provide a second control signal to a second current source of the at least one current source for a second time interval after current flowing through the energy storage element falls to a zero value, and
   wherein the integrated signal adjusts an offset of the comparator in a manner to maintain the first and second time intervals at approximately equal values.

6. The offset regulating loop of claim 5, wherein the integrated signal adjusts an offset of the comparator.

7. The offset regulating loop of claim 5, wherein the first and second time intervals are about 20 nanoseconds.

8. The offset regulating loop of claim 5, wherein the second current source is configured to provide current of an opposite polarity to the integrator than current provided to the integrator by the first current source.

9. A synchronous rectifier comprising:
   an energy storage element having a first terminal; and
   an offset regulating loop comprising:
      a comparator having an offset control input, the comparator adapted to sense a current flowing through the energy storage element, wherein the comparator is configured to provide a signal for opening a controlled switch in a current recirculation loop for the energy storage element at a selected time before current in the current recirculation loop falls to a zero value;
      a timing detector adapted to receive an output signal from the comparator;
      at least one current source configured to receive a control signal from the timing detector; and
      an integrator configured to receive current from the at least one current source and provide an integrated signal to the offset control input of the comparator,
      wherein the timing detector is adapted to provide a first control signal to a first current source of the at least one current source for a first time interval before current flowing through the energy storage element falls to a zero value, and the timing detector is adapted to provide a second control signal to a second current source of the at least one current source for a second time interval after current flowing through the energy storage element falls to a zero value; and wherein the integrated signal adjusts an offset of the comparator in a manner to maintain the first and second time intervals at approximately equal values.

10. The synchronous rectifier according to claim 9, wherein the controlled switch is coupled between the first terminal of the storage element and a reference line, the output of the comparator being coupled to the control input of said controlled switch for activating the controlled switch to decouple the first terminal of the storage element from the reference line.

11. The synchronous rectifier according to claim 9, further comprising a unidirectional freewheeling element, connected between the first terminal of the storage element and the reference line.

12. The synchronous rectifier according to claim 9, wherein the controlled switch is an NMOS transistor.

13. The synchronous rectifier according to claim 9 incorporated in a Switched Mode Power Supply circuit.

14. The synchronous rectifier according to claim 9 incorporated in a mobile electronic device.

15. The synchronous rectifier according to claim 9, wherein the selected time is about 20 nanoseconds.

16. A method for controlling switching of a synchronous rectifier comprising an energy storage element, comprising:
coupling a first terminal of the energy storage element to a power supply input in a first time interval;
coupling the first terminal of the energy storage element to a reference line in a second time interval;
detecting a current flowing in the energy storage element using a comparator having an offset control input;
decoupling the first terminal of the energy storage element from the reference line at a selected time before the current falls to a zero value responsive to detecting a selected current value in the energy storage element;
receiving, by a timing detector, an output signal from the comparator;
providing a first control signal from the timing detector to a first current source for a first time interval before current flowing through the energy storage element falls to a zero value;
providing a second control signal from the timing detector to a second current source for a second time interval after current flowing through the energy storage element falls to a zero value;
integrating current from the first and second current source to produce an integrated signal; and
providing the integrated signal to the offset control input of the comparator,
wherein the integrated signal adjusts the offset of the comparator in a manner to maintain the first and second time intervals at approximately equal values.

17. The method of claim 16, wherein the integrated signal adjusts the offset of the comparator so as to maintain the decoupling the first terminal of the energy storage element from the reference line substantially at the selected time.

18. The method of claim 16, wherein
coupling the first terminal of the energy storage element to a reference line comprises switching on a controlled switch;
detecting a current comprises detecting a voltage drop across the controlled switch; and
decoupling the first terminal comprises switching off the controlled switch causing recirculating current flowing in the energy storage element to flow through a freewheeling unipolar element.

19. The method of claim 18, wherein
detecting a current further comprises generating a control signal having a first switching edge responsive to the voltage drop exceeding at a first time a selected offset voltage and having a third switching edge responsive to the voltage drop exceeding at a second time the selected offset voltage; and
the step of decoupling the first terminal further comprises generating a second switching edge of the control signal responsive to detecting the voltage drop falling below the selected offset voltage.

20. The method of claim 19, further comprising:
activating the first current source of a charge pump upon detecting the second switching edge;
deactivating the first current source and activating the second current source upon detecting the third switching edge;
deactivating the second current source after a fixed delay from activating the first current source.

21. The method of claim 16, wherein the selected time is about 20 nanoseconds.

22. A synchronous rectifier comprising:
an energy storage element having a first terminal; and
an offset regulating loop comprising:
means to detect current flowing in an energy storage element of the synchronous rectifier; and
means to open a controlled switch in a current recirculation loop for the energy storage element at a selected time before current in the current recirculation loop falls to a zero value, the means to open being responsive to the means to detect current flowing in the energy storage element,
wherein the means to detect comprises a comparator having an offset control input;
wherein the means to open comprises a first and a second current source, wherein the first current source is configured to provide a first current to an integrator for a first time interval before the current flowing in the energy storage element falls to a zero value, and the second current source is configured to provide a second current of opposite polarity to the first current to the integrator for a second time interval after the current flowing in the energy storage element falls to a zero value;
wherein the integrator is configured to provide an integrated signal to the offset control input of the comparator; and
wherein the integrated signal adjusts an offset of the comparator in a manner to maintain the first and second time intervals at approximately equal values.

* * * * *